United States Patent [19]

Brunnhofer

[11] Patent Number: 5,520,156
[45] Date of Patent: May 28, 1996

[54] INTERNAL COMBUSTION ENGINE APPARATUS WITH FUEL FILTER FOR MOTOR VEHICLE

[75] Inventor: Erwin Brunnhofer, Guxhagen, Germany

[73] Assignee: Technoflow Tube-Systems GmbH, Fuldabruck, Germany

[21] Appl. No.: 159,187

[22] Filed: Nov. 29, 1993

[30] Foreign Application Priority Data

Feb. 26, 1993 [DE] Germany .................. 43 05 985.6

[51] Int. Cl.⁶ .................................................... F02M 37/04
[52] U.S. Cl. ............................................. 123/516; 123/510
[58] Field of Search ................................. 123/516, 514, 123/506, 510, 520, 519, 518, 521

[56] References Cited

U.S. PATENT DOCUMENTS

| | | | |
|---|---|---|---|
| 2,222,274 | 11/1940 | Antonsen | 123/516 |
| 2,579,023 | 12/1951 | Thomas | 123/516 |
| 4,117,817 | 10/1978 | Nishida | 123/516 |
| 4,651,701 | 3/1987 | Weaver | 123/509 |
| 4,763,632 | 8/1988 | Andreasson | 123/510 |
| 5,038,741 | 8/1991 | Tuckey | 123/509 |
| 5,040,516 | 8/1991 | Haraguchi | 123/509 |
| 5,195,494 | 3/1993 | Tuckey | 123/510 |
| 5,355,860 | 10/1994 | Ekstam | 123/516 |

FOREIGN PATENT DOCUMENTS

| | | | |
|---|---|---|---|
| 0203244 | 12/1986 | European Pat. Off. | 123/516 |
| 0015756 | 1/1983 | Japan | 123/509 |
| 2077863 | 12/1981 | United Kingdom | 123/509 |

*Primary Examiner*—Carl S. Miller
*Attorney, Agent, or Firm*—Herbert Dubno

[57] ABSTRACT

The fuel-filter housing for an automotive vehicle is built into an air filter or the fuel tank or the fuel-tank venting filter so that its cover is available on an outer wall of the component into which it is built for removal and replacement of the filter cartridge. Any leakage is collected in the component in which the filter housing is mounted.

16 Claims, 4 Drawing Sheets

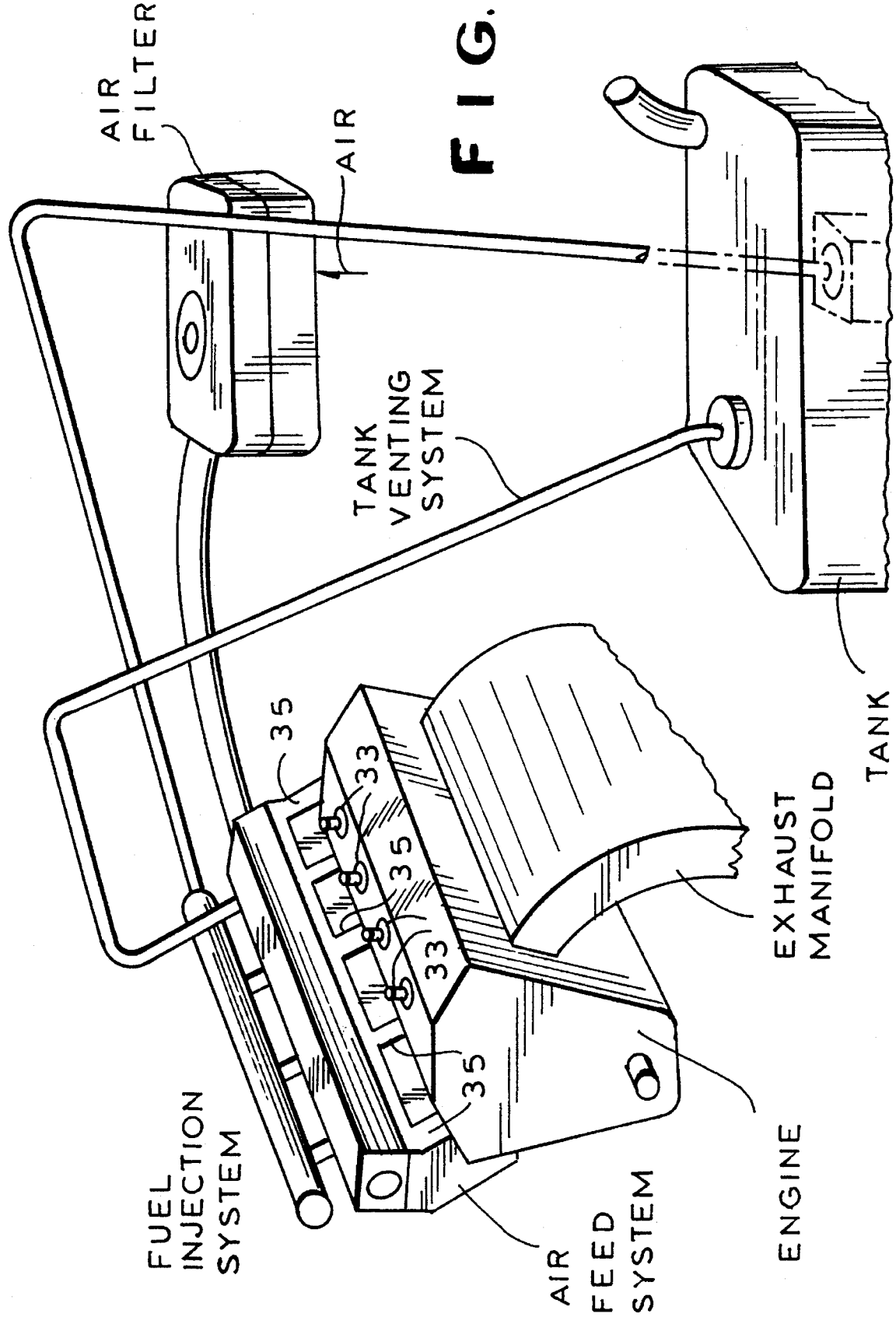

INTERNAL COMBUSTION ENGINE APPARATUS WITH FUEL FILTER FOR MOTOR VEHICLE

FIELD OF THE INVENTION

The present invention relates to a device or system for supplying fuel to the engine of a motor vehicle and, more particularly, to an internal combustion engine apparatus provided with a fuel filter for a motor vehicle.

BACKGROUND OF THE INVENTION

A typical motor vehicle driven by an internal combustion engine comprises, in addition to the engine, a fuel filter which can have a fuel filter housing of a synthetic resin material or plastic and a replaceable filter cartridge. The fuel supply system can additionally comprise a fuel pump, a fuel tank and a fuel line for delivering the fuel via the pump to the internal combustion engine.

The engine system can also comprise an air-supply system for delivering the combustion air to the engine. The air-supply system can comprise an air filter and an air duct. The fuel filter housing is traversed by the fuel under the pressure of the pump and, when the pump is energized or switched in, the fuel filter housing is under a superatmospheric pressure.

The vehicle may be provided with a tank-venting system for drawing fuel vapor out of the tank. In that case the air-supply system will, for the purposes of this application, be understood to also include the components of the tank-venting system. The term "system" is used herein to refer to all of the components provided for tank venting, air supply and fuel supply according to the invention.

In the past the fuel filter has been provided along the fuel line in a housing connected on one side to the fuel line and on the other side to the fuel injectors or carburetor. The housing was formed with a cover which could be removed to enable replacement of the filter cartridge.

For safety purposes and to avoid contamination of the environment, the filter housing had to be secure against leakage and diffusion resistant so that the fuel, which is a mixture of organic compounds like the synthetic resin housing, would not leak or diffuse through the housing and escape into the environment. From a practical point of view both the leakage rate and the diffusion rate should be ideally zero. To accomplish this, in the past, the housing had to be well sealed and of expensive construction. Fabrication was time-consuming and expensive and mounting of the fuel filter was likewise a problem. Special space had to be provided in the engine compartment of the vehicle to accommodate the filter and this was not always available. In the mounted position, the fuel filter was not always accessible readily and could not be opened and closed with absolute reliability. Security against leakage, both around the cover and by diffusion through the walls of the housing left much to be desired and decreased with time to the point that it did not satisfy modern needs, legal requirements or desires.

OBJECTS OF THE INVENTION

It is, therefore, the principal object of my present invention to provide an improved internal combustion engine apparatus for a motor vehicle, including a fuel filter, whereby these drawbacks are avoided.

Another object of the invention is to provide a system for the purposes described which can be fabricated and mounted at lower cost and with less effort, and which affords satisfactory long-term protection of the environment with respect to leakage and diffusion.

Still another object of the invention is to provide an improved fuel filter and system accommodating same which can satisfy all legal requirements even on a long-term basis for protecting the environment against leakage or diffusion.

It is also an object of this invention to overcome the drawbacks of earlier systems as described.

Finally, it is an object of the invention to provide an improved fuel filter system which allows ready access to the cartridge for replacement thereof.

SUMMARY OF THE INVENTION

These objects and others which will become apparent hereinafter are attained, in accordance with the invention, by disposing the fuel filter in one of the components of the fuel-supply system or the air-supply system in such manner that any fuel escaping from the fuel filter can only collect in that component of the system so that leakage fuel or fuel which diffuses from the housing is collected in the aforementioned component and cannot, therefore, escape into the environment.

According to the invention, the problem of leakage between the cover and body of the housing is in part solved by the following combination of features:

(a) The fuel filter has a fuel filter housing, at least one filter cartridge received in the housing and arranged to be replaced therein and a cover which is removable from the housing to afford access to the filter cartridge for replacing same.

(b) Between the cover and the fuel filter housing there is formed a gap, clearance or space which permits fuel to accumulate and thus collects any leakage between the cover and the housing.

(c) There is provided between this space and the fuel-supply system and/or the air-supply system a passage enabling that space to drain into one or both of the aforementioned systems so that leakage does not escape into the environment.

In a preferred embodiment of the invention, the cover is formed as an inset into the housing and has a collar juxtaposed with a wall of the mouth of the housing to define the aforementioned gap or space therewith, and a cover flange which is affixed to that collar and overlies a shoulder of the housing surrounding the mouth thereof. The collection space can thus be formed between the collar and the juxtaposed filter housing wall and between the cover flange and the shoulder, this space being connected by at least one bore with the fuel-supply system or the air system.

The cover is affixed to the fuel filter housing by screwing a clamping nut onto a threaded neck of the fuel filter housing, the nut overlying the flange. While sealing rings are not absolutely essential in accordance with the invention, a sealing ring may be provided between the collar and the juxtaposed seal of the housing while another sealing ring can be provided between the flange and the housing. The rings may be O-rings received in outwardly open recesses of the collar and the flange, respectively. According to yet another feature of the invention, the fuel filter is mounted in the fuel tank of the vehicle with its cover externally accessible. In that case, the collecting space is in communication with the interior of the fuel tank and any leakage can be drained back into the fuel tank. The fuel filter can be mounted in the active carbon filter of an air-venting system associated with the air-supply system and here also has an outwardly-disposed cover. The collecting space is here in communication with a collecting space for the fuel vapor. From the latter collecting space a suction line can run to the engine of the motor vehicle.

In a further embodiment, the fuel filter is incorporated into the combustion air filter of the air-supply system and has an outwardly-disposed cover affording access to the replaceable filter. The space here communicates with a collecting chamber in the direction of flow of the combustion air behind the filter body of the air filter so that leakage is drained into this region.

The filter may then be composed of a synthetic resin filter housing which has reduced blocking effect against escape into the environment or reduced security against leakage. The fuel filter can then satisfy laws and regulations regarding environment protection only after it has been built into one of the components of the fuel-supply or air-supply systems.

The fuel filter can be mounted directly in a wall of the fuel tank or in the active carbon filter of the tank venting unit from which the suction line can run to the engine. It can be incorporated in the air filter of the air-supply system. Regardless of the component into which it is built, the cover should be accessible along the outer wall of that component to enable the cover to be removed, the filter cartridge to be accessed and the replacement to be effected. Special cover sealing arrangements are not required. The fuel filter can be formed as a modular component with a fuel filter sealing injection molded from thermoplastic synthetic resin material with its internal fittings formed unitarily therewith. The cover can also be injection molded from thermoplastic material. The fuel filter housing and the cover can be diffusion-tight and can be composed, if desired, of multi-layered plastic with certain of the layers forming barriers against diffusion of the fuel out of the housing or diffusion of the fuel components through the housing. It is also possible, however, to tolerate significant diffusion rates when the filter is built into one of the components of the air supply or fuel system as described.

The invention basically recognizes that it is difficult, if not impossible, to completely prevent diffusion or mechanical leakage of fuel from a filter housing, especially when the fuel is under pressure and provides in a simple and economical way, protection against pollution of the environment with the fuel by enabling components which normally contain fuel to capture any leakage or diffusing fuel. The capture or evacuation of the fuel from the component is effected through the conventionally-provided suction line to the engine, for example, or by draining the leakage back into the fuel tank so that it will be combusted in the normal course of operation of the engine. As a consequence, the invention satisfies all environmental regulations and laws.

Since the integration of the fuel filter in the components is simple, the invention can be practiced at low cost.

The internal combustion engine apparatus for a motor vehicle can thus comprise:

an internal combustion engine;

a fuel-supply system for the internal combustion engine comprising:

a fuel tank component, a fuel pump component for pumping fuel from the fuel tank component to the engine, and a fuel line connected with the fuel tank component and the fuel line component for feeding pumped fuel to the engine;

an air-supply system comprising:

an air filter component, and an air duct connected with the air filter and with the engine for feeding air to the engine;

a fuel filter connected in a path of fuel supplied by the pump to the engine and comprising:

a fuel-filter housing composed of a synthetic resin material and disposed in one of the components of a respective one of the systems so that uncontrolled escape of fuel from the fuel-filter housing is captured in the one of the components, and a replaceable filter cartridge in the fuel-filter housing and traversed by the fuel as the fuel travels along the path under a pressure of the fuel generated in the housing by the fuel pump component.

BRIEF DESCRIPTION OF THE DRAWING

The above and other objects, features and advantages of the invention will become more readily apparent from the following description, reference being made to the accompanying highly diagrammatic drawing in which:

FIG. 1A is a detail view of the region IA of FIG. 1 drawn to a larger scale;

FIG. 5 is a perspective view diagrammatically illustrating the fuel and air-supply system for an internal combustion engine according to the invention.

SPECIFIC DESCRIPTION

Figure 1:
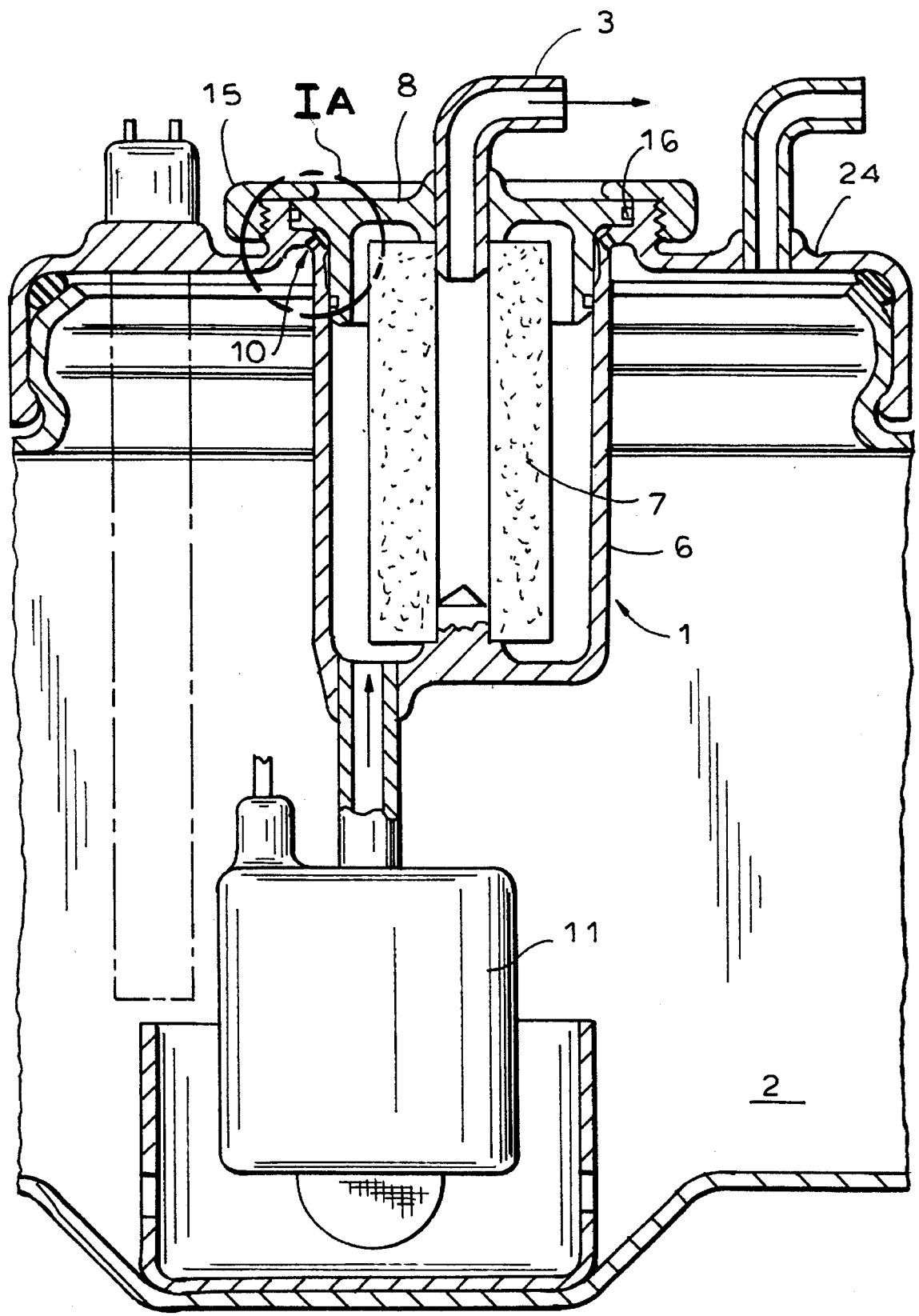
FIG. 1 is a vertical section through an apparatus according to the invention in which the fuel filter is incorporated in a wall of the fuel tank.

Referring first to FIG. 5, it will be apparent that the drive system for a motor vehicle can include an internal combustion engine 30 whose crankshaft 31 can be connected to a transmission and the wheel drive mechanism of the vehicle. The engine 30 has an exhaust manifold system represented at 32, spark plugs 33 and an air-feed system including an intake manifold 34 with feeders 35 communicating with the intake ports of the engine. The intake manifold is connected by the air-supply duct 36 with an air filter 37 having an externally-accessible housing wall 38 in which the fuel filter can be provided in the manner described. The vehicle also has a fuel tank 39 with a filler pipe 40 through which the filler can be supplied to the tank. A fuel pump 41 can feed the fuel and the fuel-supply system further comprises a fuel line 42 which delivers the fuel to the fuel injector system represented diagrammatically at 43. The tank 39 can be provided with a venting filter 44 of a tank-venting system connected by a suction pipe 45 to the intake manifold so that the fumes from the tank are fed to the cylinder of the engine with the air supplied thereto. The dot-dash line 45 represents a path of the fuel and is intended to indicate that, along the path between the pump and the fuel injection system, a filter is provided as described in connection with FIGS. 1 and 1A, FIG. 2 or FIGS. 3 and 4. As can be seen from these Figures, the basic construction of a fuel filter 1 is that of a filter housing 6 and a replaceable cartridge 7 received therein. That filter 1 can be provided in or on the fuel tank component 2 of the fuel system (FIGS. 1 and 1A), in or on the tank venting unit 19 shown in FIG. 2 of the air-supply system or in or on the air filter 4 shown in FIG. 3.

Figure 3:
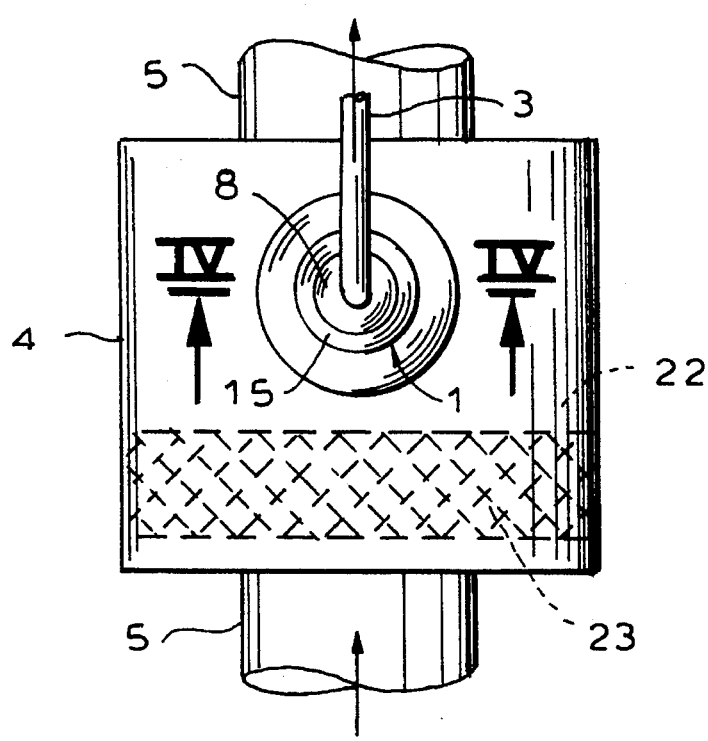
FIG. 3 is an elevational view showing a fuel filter in the air-supply system of a motor vehicle.

In FIGS. 1 and 1A, the fuel filter 1 is shown to be mounted in the fuel tank 20 and to be connected by the fuel line 3 to the internal combustion engine. FIG. 3 shows that the air system has an air filter 4 and an air duct 5 for the combustion air.

As previously described, the fuel filter 1 has a housing 6 composed of thermoplastic synthetic resin and receiving the replaceable filter cartridge 7. To allow removal of the filter cartridge 7, a removable cover 8 is mounted on the housing 6. Between the cover 8 and the housing 6 there is provided a gap or spacing 9 which corrects leakage fuel and which is connected in turn by a passage 10 with the interior of the component on which the filter is mounted so that the gap 9 is in communication with the interior of this component of the fuel-supply system and/or the air system in a manner preventing external leakage. The fuel filter housing 6 and the cartridge 7 are at superatmospheric pressure when the fuel pump 11 is turned on.

In one embodiment and in the preferred embodiment of the invention the cover 8 of the fuel filter housing 6 is an inset cover with a collar 12 and a flange 13, the flange covering resting upon a shoulder 14 of the filter housing 6. This space or gap 9 is provided between the collar 12 and the juxtaposed wall of the filter housing 6 and between the flange 13 and the shoulder 14, the gap or space 9 being connected by at least one bore with the fuel system or the air system.

Figure 2:
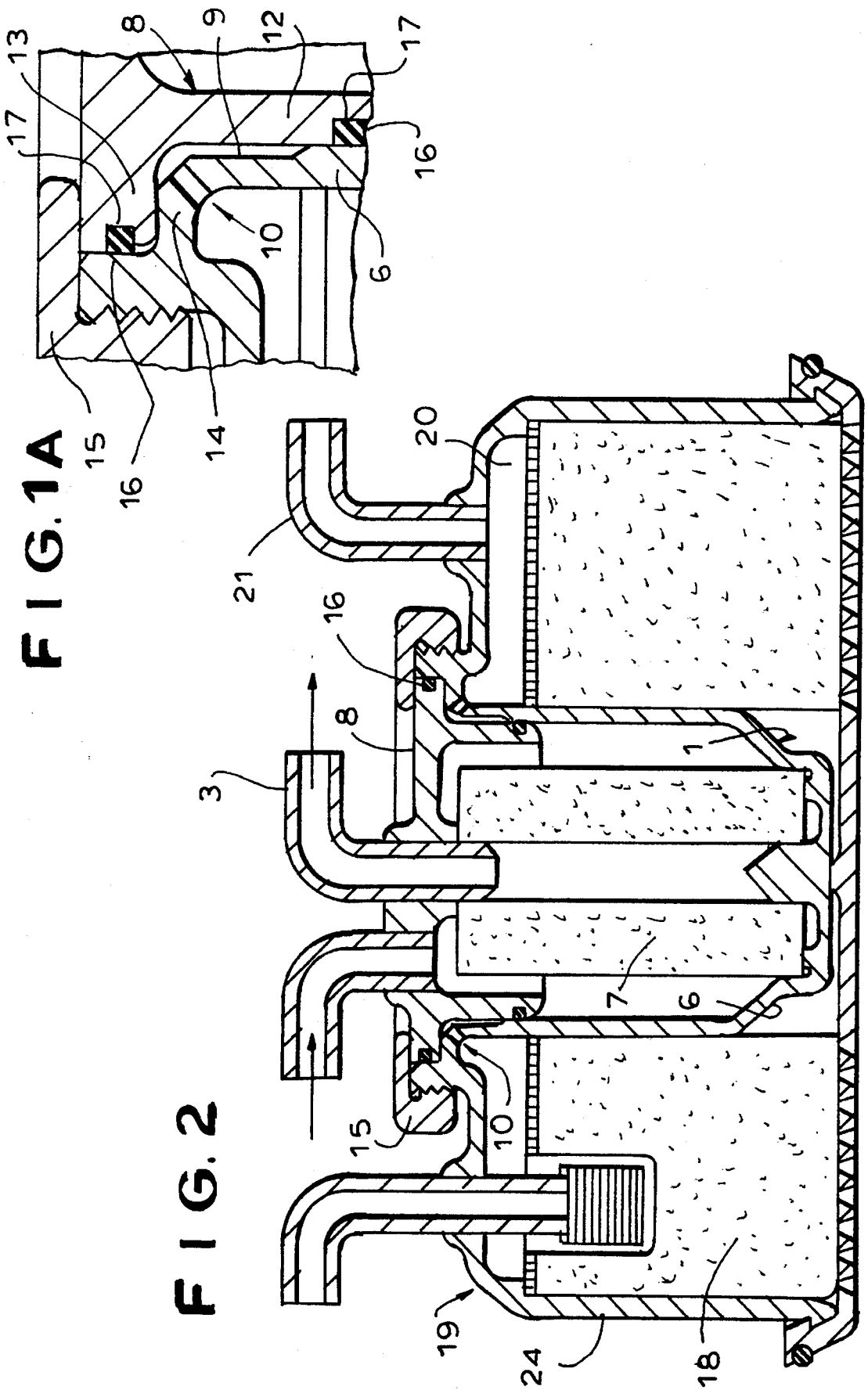
FIG. 2 is a vertical section through an active carbon filter in a fuel tank forming part of the tank venting system and in which a fuel filter is provided.

The cover 6 is held forcibly against the shoulder 14 of the housing by a clamping nut 15 threaded onto a mouth 50 of the housing 6. In the gap 9, two sealing rings 16 can be provided, at least one of these rings being received in a recess 17 of the cover 6. In the embodiment of FIGS. 1 and 2, the upper sealing ring 16 may suffice and indeed the sealing rings may be completely eliminated if desired.

In the embodiment of FIG. 1, the filter 1 is located in the fuel tank 2 with its cover 8 being accessible from the exterior and the correction space 9 connected with the interior of the fuel tank in a leak-tight manner.

In the embodiment of FIG. 2 the fuel filter 1 is disposed in the active carbon filter 18 of the tank venting system 19 with its cover 8 lying externally and this readily accessible. Here the space 9 communicates with a collecting compartment 20 for the fuel vapors in a leak-tight manner. From the collecting chamber 20, a suction line 21 runs to the engine and can correspond to the line 45.

Figure 4:
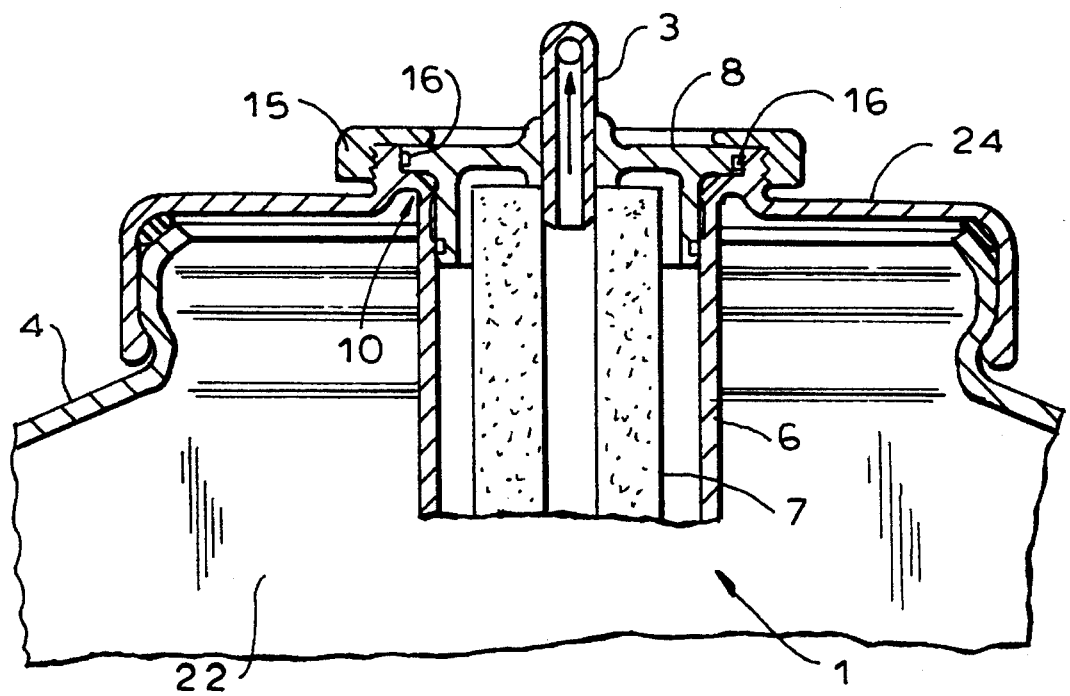
FIG. 4 is a section taken along the line IV—IV of FIG. 3 drawn to a larger scale.

In the embodiment of FIGS. 3 and 4, the fuel filter 1 is disposed in the combustion air filter 4 of the air system with an externally disposed cover. The gap or space 9 is here in communication with the collecting chamber 22 which is located behind the filter body 23 in the flow direction of the combustion air.

It will be apparent that the fuel filter 1 shown in FIGS. 1–4 and the housing 6 of it are cylindrical. By comparison of FIGS. 1–3, the modular construction will be apparent. The housing 6 is injection molded of thermal plastic synthetic resin and comprises injection-molded components. The cover 6 is also of thermoplastic synthetic resin. In all cases any leakage from the fuel filter is collected or captured by one of the components of the systems described. When the filter housing 6 is not highly diffusion resistant or there is a reduced blockage or barrier effect to diffusion or locations of leakage arise, the leaking fuel is always collected and prevented from reaching the environment in a detrimental manner.

I claim:

1. An internal combustion engine apparatus for a motor vehicle, said apparatus comprising:

an internal combustion engine;

a fuel-supply system for said internal combustion engine comprising:

a fuel tank component, a fuel pump component for pumping fuel from said fuel tank component to said engine, and a fuel line connected with said fuel tank component and said fuel line component for feeding pumped fuel to said engine;

an air-supply system comprising:

an air filter component, and an air duct connected with said air filter and with said engine for feeding air to said engine;

a fuel filter connected in a path of fuel supplied by said pump to said engine and comprising:

a fuel-filter housing composed of a synthetic resin material and disposed in one of said components of a respective one of said systems but separate from the respective one of said components so that uncontrolled escape of fuel from said fuel-filter housing is captured in said one of said components, a replaceable filter cartridge in said fuel-filter housing and traversed by said fuel as said fuel travels along said path under a pressure of said fuel generated in said housing by said fuel pump component, and a removable cover fitted onto said housing and affording access to said replaceable filter cartridge.

2. The apparatus defined in claim 1 wherein said fuel filter further comprises:

means defining a leakage-collecting space between said cover and said fuel-filter housing for collecting fuel leaking from said fuel-filter housing; and means connecting said space with said one of said components for delivering collected fuel leaking from said housing to said one of said components.

3. The apparatus defined in claim 2 wherein said cover is fitted into said housing and comprises a collar extending into a cover opening formed in said housing, and an annular flange overhanging said opening, said flange forming a seal with a juxtaposed shoulder of said housing surrounding said opening, said space being located inwardly of said seal around said collar, said housing having at least one bore connecting said space with said one of said components.

4. The apparatus defined in claim 3, further comprising a clamping nut threaded onto said housing, overlying said flange and holding said flange against said shoulder.

5. The apparatus defined in claim 3, further comprising a sealing ring received in a recess in said collar and engaging said housing in said space.

6. The apparatus defined in claim 3, further comprising a sealing ring between said flange and said housing.

7. The apparatus defined in claim 2 wherein said fuel filter is located in said fuel-tank component with said cover accessible from a location external of said tank component.

8. The apparatus defined in claim 7 wherein said air-supply system includes a tank vent in said tank connected with said engine to draw fumes from said tank component, said filter being received in said vent and emptying said space into a collecting compartment of said vent for fuel vapors, said compartment being connected to said engine.

9. The apparatus defined in claim 2 wherein said fuel filter is located in said air-filter component with said cover accessible from a location external of said air-filter component, said space communicating with an interior of said air-filter component at a location behind a filter body thereof.

10. The apparatus defined in claim 2 wherein said fuel filter is formed as a modular unit with the housing injection molded of thermoplastic synthetic resin with internal structures, said cover being injection molded of thermoplastic synthetic resin.

11. The apparatus defined in claim 1 wherein said housing is composed of a plastic of limited utility in preventing fuel leakage and protection of the environment against fuel leakage is effected by incorporating said housing in said one of said components.

12. The apparatus defined in claim 11 wherein said housing is built into said tank component.

13. The apparatus defined in claim 11 wherein said fuel filter is built into an active carbon filter venting an interior of said tank component to said engine through a suction line.

14. The apparatus defined in claim 11 wherein said fuel filter is built into said air-filter component.

15. The apparatus defined in claim 11 wherein said fuel filter is built into an outer wall of said one of said components and has a cover which closes an opening through which said filter cartridge is accessible.

16. The apparatus defined in claim 15 wherein said fuel filter is formed as a modular unit with the housing injection molded of thermoplastic synthetic resin with internal structures, said cover being injection molded of thermoplastic synthetic resin.

* * * * *